No. 12,188. REISSUED DEC. 29, 1903.

E. C. THURNAU.

SHOW CASE.

APPLICATION FILED MAR. 7, 1903.

4 SHEETS—SHEET 1.

Witnesses:
Ira D. Bryp
J. B. Weir

Inventor:
Edward C. Thurnau
by Bakley & Durand
Attorneys.

No. 12,188. REISSUED DEC. 29, 1903.

E. C. THURNAU.

SHOW CASE.

APPLICATION FILED MAR. 7, 1903.

4 SHEETS—SHEET 2.

Witnesses:
S. A. D. Perry
J. B. Weir

Inventor:
Edward C. Thurnau
by Bulkley & Duvall
Attorneys.

No. 12,188. REISSUED DEC. 29, 1903.

E. C. THURNAU.

SHOW CASE.

APPLICATION FILED MAR. 7, 1903.

4 SHEETS—SHEET 3.

Witnesses:
Ira D. Perry
J. B. Weir

Inventor:
Edward C. Thurnau
by Bulsley & Durand
Attorneys

No. 12,188. REISSUED DEC. 29, 1903.

E. C. THURNAU.

SHOW CASE.

APPLICATION FILED MAR. 7, 1903.

4 SHEETS—SHEET 4.

Witnesses:
J. B. Weir
C. M. Yarnich

Inventor:
Edward C. Thurnau
by Bulkley & Durand
Attys.

No. 12,188. Reissued December 29, 1903.

UNITED STATES PATENT OFFICE.

EDWARD C. THURNAU, OF CHICAGO, ILLINOIS.

SHOW-CASE.

SPECIFICATION forming part of Reissued Letters Patent No. 12,188, dated December 29, 1903.

Original No. 713,534, dated November 11, 1902. Application for reissue filed March 7, 1903. Serial No. 146,796.

*To all whom it may concern:*

Be it known that I, EDWARD C. THURNAU, a citizen of the United States, residing at Chicago, in the county of Cook and State of Illinois, have invented certain new and useful Improvements in Show-Cases; and I do hereby declare the following to be a full, clear, and exact description of the invention, such as will enable others skilled in the art to which it appertains to make and use the same.

This invention relates to a novel construction in an extensible show-case, the object being to provide a device of this character which can be readily built up and added to at any time in a very simple manner; and it consists in the features of construction and combinations of parts hereinafter fully described and claimed.

Figure 1:
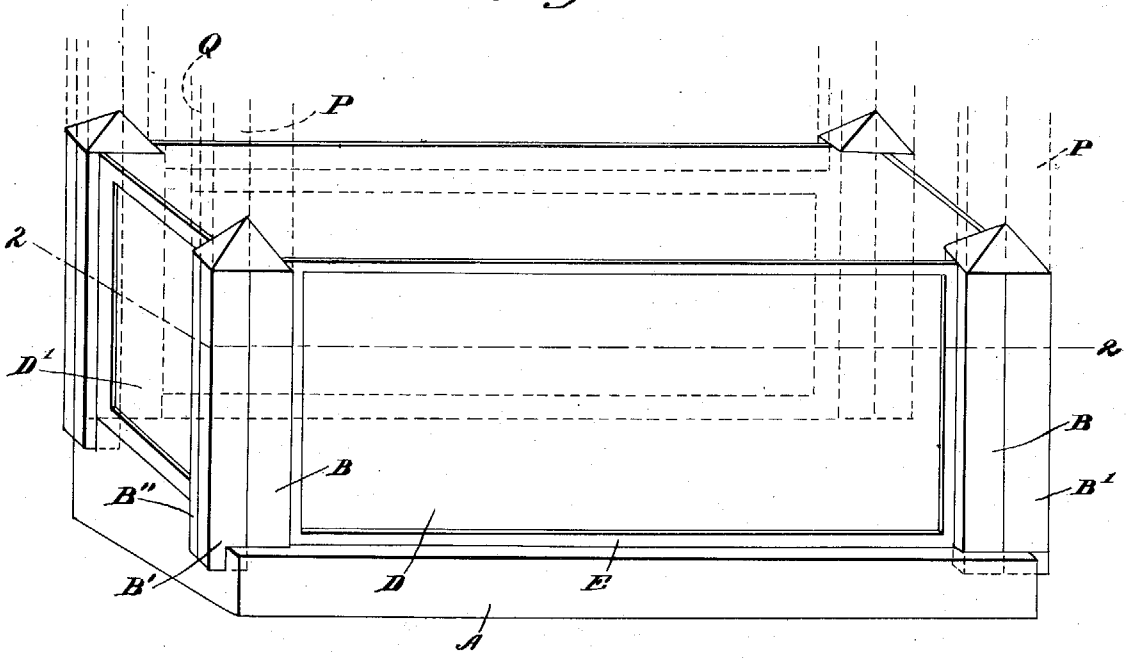
Figure 2:
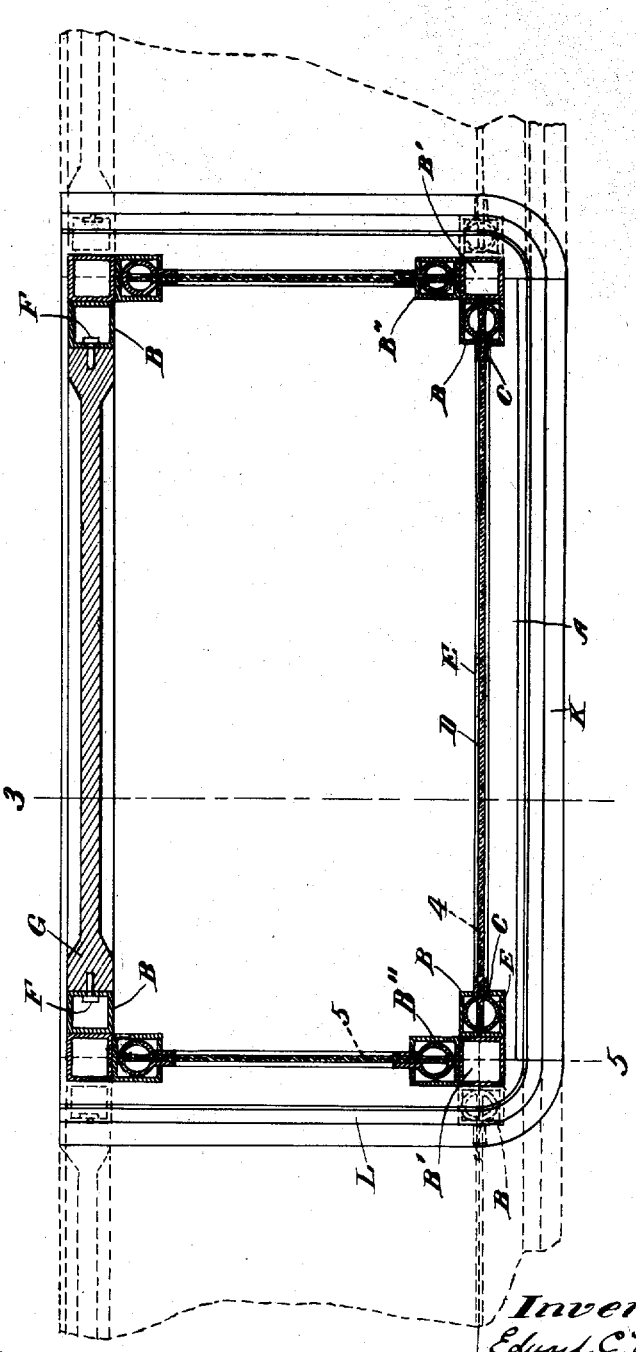
Figure 3:
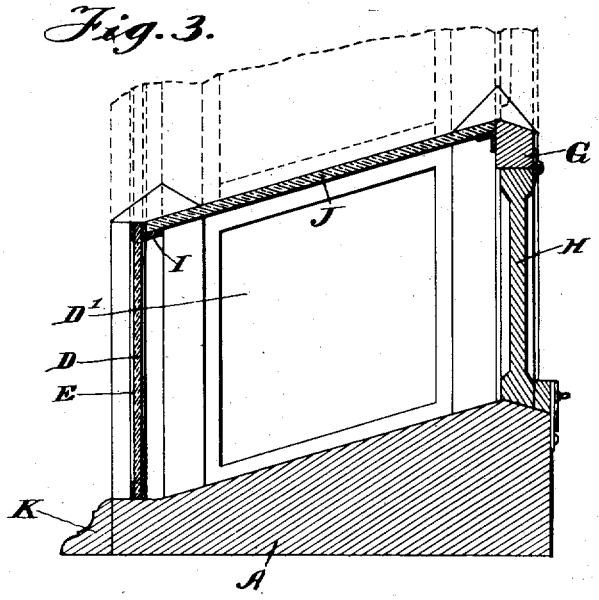
Figure 4:
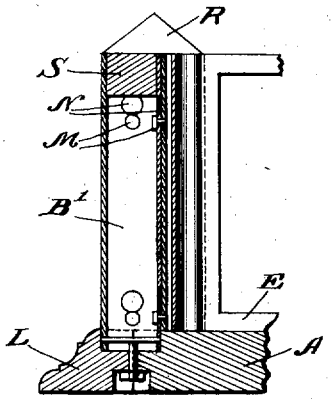
Figure 5:
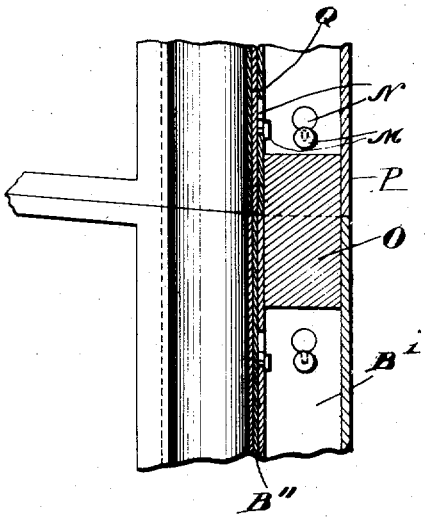
Figure 6:
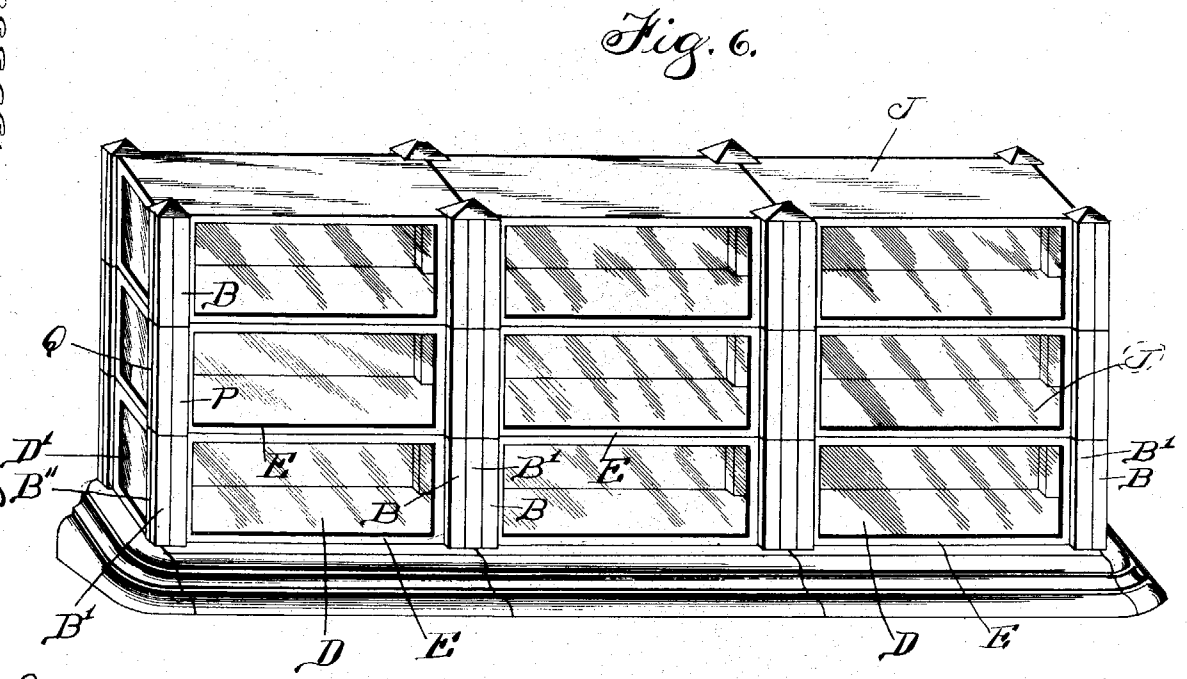

In the accompanying drawings, illustrating my invention, Figure 1 is a perspective view of a show-case constructed in accordance with my invention, the ornamental molding around the base being removed. Fig. 2 is a plan section of same on the line 2 2 of Fig. 1. Fig. 3 is a vertical transverse section of same on the line 3 3 of Fig. 2. Fig. 4 is a fragmentary detail section, on an enlarged scale, on the line 4 4 of Fig. 2. Fig. 5 is a similar section on the line 5 5 of Fig. 2, showing the manner of building one section of show-case above another. Fig. 6 is a perspective showing several of the sections or compartments joined together in the manner indicated in Figs. 1, 2, 3, and 5.

My device is similar in a certain respect to the sectional bookcases now so generally used, which are built up of so-called "units" to any desired height or width. To adapt this scheme to show-cases obviously offers many difficult problems not presented by the bookcases.

My device consists of a base A, to each of the four corners of which is secured an upright corner member, each consisting of a group of three square tubes or posts B B′ B″. Each of the posts B on the forward corners of the base is set in a recess in the base and is provided in one face with a longitudinal slot C, adapted to receive the ends of the glass D, forming the front wall of the case. Said base A is provided at its ends with additional recesses adapted to receive said tubes B′ and B″, which are secured together and to said posts B and the base A, said tubes B″ being provided in one wall with longitudinal slots adapted to receive the panes D′, forming the side walls of the case. The said glass walls D and D′ are mounted in metallic frames E, the said frames being enlarged and of tubular form at the short edges of the panes, so as to closely fit within the tubes B′ and B″ and prevent rattling. The adjacent inner faces of the rear posts B are provided with short recesses at their upper ends to receive lugs F on the ends of a bar G, to which the door H is hinged. The framing of the pane D, forming the front wall of the case, is provided along the upper edge of said pane with an inwardly-projecting flange I, adapted to support the forward edge of the pane J, forming the top of the case, or a shelf within the case, if the latter is extended upwardly, the rear edge of said pane J being supported upon a similar flange secured to the bar G. The said corner-posts B are secured in the base in any suitable manner to maintain their rigidity, and the posts B′ and B″ are so set into said base that they project beyond the latter a distance equal to one-half the diameter of one of the tubes.

Where a single section or compartment is used, strips K and L, of molding, are secured to the front and side edges of the base A, such strips serving to give same a finished appearance in an obvious manner.

Should it be desired to extend the show-case lengthwise, the strips of molding L are removed and an additional base set end to end with the base of the first section or compartment and corresponding in every way therewith. The posts B of the latter base are secured to the posts B′ in any convenient manner—as, for instance, by means of buttons M on the posts B entering keyhole-slots N in the adjacent faces of the posts B′. Any number of sections may thus be united to form a show-case of any desired length, and such sections may be built up to any desired height in the following manner:

Each of the posts B′ forms a socket to receive the square shank O of an extension member P, the latter carrying a member Q, adapted to form an extension of the tube B″ of each corner-post. Members forming extensions of the posts B may be secured to the member P in any suitable manner. By the insertion of additional panes in the extension members and the addition of the doors the show-case can obviously be enlarged to any desired height.

To give the case a more finished appearance, corner-plates R, having shanks S, are mounted in the upper ends of the posts B′ or the extensions thereof.

I have avoided specific description and illustration of minor details of construction, such as particular means for securing the posts B, B′, and B″ in the bases A and firmly securing the shanks O in the posts B′, &c., as such details are of minor importance and may be changed and varied without departing from the spirit of my invention.

The metal framing of the glass makes the latter act to firmly brace the corner-posts in an obvious manner.

The glass walls are readily removable from the posts, and hence the structure as a whole can be readily taken apart and put together. In other words, the parts are all so fitted together that they may be easily assembled in place and so that the structure as a whole may be readily knocked down and taken apart and packed in convenient form.

I have shown and prefer to use a base having an inclined upper face and to lay the tops parallel therewith, for the reason that if the case is built up to any considerable height it will bring more of the contents into view than if the base and shelves were perfectly horizontal.

I claim as my invention—

1. A show-case comprising a base, posts mounted thereon, longitudinal recesses in said posts, adapted to receive the glass walls, metallic-framed glass walls adapted to be mounted in said posts, and devices carried by said glass walls adapted to support the top of the case.

2. The combination with a case provided with corner members having longitudinal recesses, of metallic-framed glass walls adapted to enter said recesses, a bar spanning two of said posts, a door hinged to said bar, and projections on the framing of the glass and on said bar adapted to support a glass top.

3. An extensible show-case comprising a base, corner members on said base each consisting of a plurality of upright tubes set side by side, longitudinal slots in said tubes adapted to receive the glass walls of the case and a support for a swinging door, devices on said glass walls and said support for supporting the glass top, similar corner members provided with shanks adapted to fit within one of the tubes comprising each of the first-named corner members and adapted to be mounted on the latter and receive a second set of glass walls and a support for a swinging door, said second set of glass walls and support being similarly provided with devices for supporting a glass top.

4. An extensible show-case comprising a plurality of bases adapted to be set end to end and each provided with posts both at the front and the rear, a longitudinal slot in each of the front posts adapted to receive the panes forming the front walls of the case, a recess in each of the rear posts adapted to receive a support for the swinging door, an additional post secured adjacent to each of the first-mentioned posts and provided with a longitudinal slot adapted to receive the end and dividing walls of the case, and devices on said walls of said case and on said supports for the swinging doors for supporting panes forming the glass top of the case.

5. An extensible show-case comprising a plurality of bases adapted to be set end to end and each provided with tubular front and rear posts, a longitudinal slot in each of the forward posts adapted to receive the panes forming the front wall of the case, a recess in each of the rear posts adapted to receive a support for the swinging door, additional tubular posts secured adjacent to the aforesaid posts and each provided with a longitudinal slot adapted to receive the end and dividing walls of the case, devices on said walls of said case and on said supports for the swinging doors for supporting panes forming the top of the case, and means for building up said case comprising post members corresponding in shape and construction with said posts and provided with shanks adapted to enter the latter to support said last-named members thereon, said last-named post members being adapted to receive additional sets of panes, &c., to build up said case, substantially as described.

6. In a show-case, the combination with a base having tubular posts provided with longitudinal slots, of metallic-framed glass walls adapted to enter said slots, the framing of said glass walls at the ends thereof being enlarged to snugly fit said tubular posts, whereby said glass is held against longitudinal movement, and a top wall supported by said glass walls.

7. In a show-case, the combination with a base provided with rigid tubular posts having longitudinal recesses for the reception of glass walls, recesses being formed in the ends of said base adjacent said posts, of a pair of additional tubular posts removably secured to and adapted to form a part of each of the aforesaid posts and lying partially within said recesses, longitudinal slots in one of each of said pair of additional posts adapted to receive glass walls, and molding-strips removably secured to the ends of said base and provided with recesses adapted to receive the projecting portions of said additional posts.

8. In an extensible show-case, the combination with a plurality of bases, each provided with posts at or near its corners and recesses in the ends of said bases adjacent said posts, of additional posts adapted to receive the end and partition walls of the show-case adapted to be removably secured to the aforesaid posts of each of said bases and extend into each of said recesses, and molding-strips removably secured to the outer ends of the end bases and provided with recesses adapted to receive the projecting portions of said additional posts receiving the end walls of said case.

9. In an extensible show-case, the combination of a plurality of sections, each comprising a base provided with posts adapted to receive the front wall and door-support, of a pair of additional posts secured to each of the aforesaid posts and receiving the end and partition walls of said sections, said additional posts being interposed between and secured to each two adjacent first-mentioned posts of adjacent sections and thereby secure said sections together to form a continuous case.

10. In an extensible show-case, the combination of a plurality of sections, each comprising a base provided with posts adapted to receive the front wall and door-support, of additional posts adapted to be secured to said posts and to receive the end and partition walls of said sections, said additional post members being adapted to be interposed between and secured to each two adjacent first-mentioned posts of adjacent sections and thereby secure said sections together to form a continuous case, and means for extending said case in height comprising post members adapted to be mounted upon said posts and forming extensions thereof, and adapted to receive additional front and side walls and door-supports, substantially as described.

11. An extensible show-case structure comprising a plurality of separable sections or compartments mounted one upon the other, each section or compartment having a glass top wall adapted to serve as the bottom of the next upper section or compartment.

12. An extensible show-case structure, comprising a plurality of separable sections mounted one upon the other, each section being constructed with removable front and end walls, and each section having also a removable top wall adapted to serve as the bottom of the next upper section.

13. An extensible show-case structure, comprising a plurality of separable sections mounted one upon the other, each section being constructed with removable front and end glass walls, and each section having also a hinged or swinging back wall and a removable top wall, the top wall of each section being adapted to serve as the floor of the next upper section.

14. An extensible show-case structure, comprising a plurality of sections mounted one upon the other, each section being constructed with removable glass front and end walls, and each section having also four corner members and a removable glass top wall, the top wall of each section serving as the floor of the next upper section, and the post members of each section supporting the post members of the section next above.

15. An extensible show-case structure comprising a plurality of separable sections mounted one upon the other, each section being provided with front and end walls and a swinging back wall, and each section having also an inclined top wall adapted to serve as the inclined floor of the next upper section.

16. An extensible show-case structure comprising a plurality of separable sections mounted one upon the other, another plurality of sections mounted one upon the other and end to end with said first-mentioned sections, each section being constructed with removable glass front and end walls, glass end walls of the intermediate sections being adapted to serve as the end walls of adjacent sections, and each section having also a removable glass top wall adapted to serve as the floor of the next upper sections.

17. An extensible and knockdown show-case structure comprising a plurality of separable sections, each section having removable glass front and end walls, and each section being also provided with a removable top wall and a swinging back wall, and said sections being adapted to be mounted one on top of the other.

18. An extensible show-case structure comprising a series of separable sections mounted one upon the other, a second series of sections arranged one above the other and at one side of said first-mentioned series of sections, and a third series of sections mounted one upon the other at the other side of said first-mentioned series, each section of said first-mentioned series having removable glass front and end walls, each end wall serving also as the end wall of an adjacent section, and the sections of all three of said series being each provided with a removable glass top wall adapted to serve as the floor of the next upper section.

19. An extensible show-case structure comprising a plurality of separable sections arranged end to end, a single removable partition between the ends of the sections, other sections mounted on top of said first-mentioned sections, and each of the lower sections being provided with a removable top wall adapted to serve as the floor of the next upper section.

20. A knockdown show-case structure divided both vertically and horizontally into a plurality of separable or detachable sections, each two horizontally-adjacent sections being separated by a single removable partition, and each two vertically-adjacent sections being also separated by a single removable glass plate.

21. An extensible show-case structure divided both vertically and horizontally into a plurality of separable sections, each section having a removable glass front wall, the sections being separated horizontally by removable partitions, and the sections being separated vertically by removable horizontal walls, each section being also provided with a swinging back wall.

22. An extensible show-case structure divided both vertically and horizontally into separable sections, each two horizontally-adjacent sections being separated by a single removable partition, and each two vertically-adjacent sections being separated by a horizontally-disposed wall tilted downward at its forward edge, and each section being provided with a swinging back wall.

23. An extensible show-case structure comprising a plurality of separable sections mounted one upon the other, each section having glass front and end walls, and each section being also provided with a swinging back wall or door, the lower section having a top wall resting on the bottom of the upper section.

24. An extensible show-case structure comprising a plurality of sections mounted one upon the other, each section having removable front and end walls, the front and end walls of one section supporting the like walls of the next upper section, and each section being provided with a swinging back.

25. An extensible show-case structure divided vertically into sections separated by glass plates, each plate being common to two of the sections but carried by one of the latter, and each section having a swinging back wall.

26. An extensible show-case structure comprising a plurality of sections mounted one upon the other, each section having removable glass front and end walls, and each section having also a removable glass top wall, the top wall of one section serving as the floor of the next upper section, and the front and end walls of one section supporting the like walls of the next upper section, each section having a swinging back wall.

27. An extensible case structure comprising a plurality of separable sections mounted one upon the other, each section having corner parts, the upper ends of the parts of the lower section being engaged by the lower ends of the parts of the upper section, and each section being provided with removable walls.

28. An extensible case structure comprising a plurality of separable knockdown sections mounted one on top of the other, the lower section having a top wall adapted to serve as the bottom of the upper section, and each section having removable side walls.

29. An extensible case structure, comprising a plurality of separable sections mounted one on top of the other, each section having a swinging door, and the lower section having a top wall adapted to serve as the bottom of the upper section.

30. An extensible case structure, comprising a plurality of separable sections mounted one on top of the other and end to end, the lower sections being provided with top walls adapted to serve as bottoms for the upper sections, and the end-to-end sections being separated by single walls.

Signed by me at Chicago, Cook county, Illinois, this 19th day of February, 1903.

EDWARD C. THURNAU.

Witnesses:

A. L. DURAND,

WM. A. HARDERS.